(12) United States Patent
Baek et al.

(10) Patent No.: US 8,832,356 B2
(45) Date of Patent: Sep. 9, 2014

(54) APPARATUS AND METHOD FOR FLASH MEMORY ADDRESS TRANSLATION

(75) Inventors: Sung Hoon Baek, Daejeon (KR); Jin Kyu Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 645 days.

(21) Appl. No.: 13/025,267

(22) Filed: Feb. 11, 2011

(65) Prior Publication Data

US 2011/0271039 A1    Nov. 3, 2011

(30) Foreign Application Priority Data

Feb. 11, 2010  (KR) .......................... 10-2010-0012821

(51) Int. Cl.
*G06F 12/00* (2006.01)
*G06F 12/02* (2006.01)

(52) U.S. Cl.
CPC .... *G06F 12/0246* (2013.01); *G06F 2212/7205* (2013.01); *G06F 2212/7201* (2013.01)
USPC .................................. 711/103; 711/E12.008

(58) Field of Classification Search
CPC .................... G06F 12/0246; G06F 2212/7201; G06F 2212/7205

USPC ........................................................ 711/103
See application file for complete search history.

(56) References Cited

U.S. PATENT DOCUMENTS

| | | | |
|---|---|---|---|
| 6,219,800 | B1 | 4/2001 | Johnson et al. |
| 6,745,284 | B1 | 6/2004 | Lee et al. |
| 6,941,420 | B2 | 9/2005 | Butterworth et al. |
| 7,856,528 | B1* | 12/2010 | Frost et al. ..................... 711/114 |
| 2006/0200697 | A1* | 9/2006 | Ito ..................... 714/6 |
| 2008/0229012 | A1 | 9/2008 | Therene et al. |
| 2008/0250270 | A1 | 10/2008 | Bennett |
| 2008/0270690 | A1* | 10/2008 | English ......................... 711/114 |
| 2011/0145475 | A1* | 6/2011 | Eleftheriou et al. .......... 711/103 |

FOREIGN PATENT DOCUMENTS

| | | |
|---|---|---|
| KR | 10-2007-0120731 | 12/2007 |
| KR | 10-2008-0112743 | 12/2008 |
| KR | 10-2009-0040207 | 4/2009 |
| KR | 10-2009-0079197 | 7/2009 |

* cited by examiner

*Primary Examiner* — Aracelis Ruiz
(74) *Attorney, Agent, or Firm* — Volentine & Whitt, PLLC (57) ABSTRACT

Provided is a flash memory address translation method that may maintain at least one chip that may be divided based on at least one horizontal bank and at least one vertical channel, and may divide the at least one bank by at least one stripe partition, managing an error of a chip without deterioration in a performance of a small writing.

19 Claims, 8 Drawing Sheets

APPARATUS AND METHOD FOR FLASH MEMORY ADDRESS TRANSLATION

CROSS-REFERENCE TO RELATED APPLICATION(S)

This application claims the benefit under 35 U.S.C. §119(a) of Korean Patent Application No. 10-2010-0012821, filed on Feb. 11, 2010, in the Korean Intellectual Property Office, the entire disclosure of which is incorporated herein by reference for all purposes.

BACKGROUND

1. Field

The following description relates to an address translation apparatus and method for effectively supporting a chip fault-tolerance function in a memory.

2. Description of Related Art

Recently, technologies of effectively providing and storing a large amount of information have been actively conducted.

A Redundant Array of Inexpensive Disks (RAID), one of a number of information storage schemes, may divide and redundantly store data over multiple hard disks. There are various schemes for dividing data, and the data dividing scheme is referred to as a level. A reliability of a storage device or a throughput of the storage device may increase depending on the level.

Specifically, the RAID may combine multiple disks into a single unit and may enable the multiple disks to perform as a single logical disk using either a hardware-based method or a software-based method. The hardware-based method may enable the multiple disks to be shown, to an operation system, as the single disk, and the software-based method may be embodied in an operation system and may enable the multiple disks to be shown, to the user, as the singe disk.

The RAID may store information using a Flash Translation layer (FTL) that is one of a number of storage schemes, because an overwrite operation cannot be performed in a write area of a flash memory before an erase operation is performed, a read operation and the write operation may be performed based on a page unit, and the erase operation may be performed based on a block unit that is greater than the page unit.

However, a conventional storage device does not include the erase operation and needs to perform the overwrite operation, and thus, the FTL may have a mapping table between a logical address and a physical address of the flash memory, preventing the restrictions of the flash memory from being revealed to an outside of the storage device.

As an example, when data is overwritten in the same logical address, the FTL may store the data in a page of another physical address without performing the erase operation, and may update a mapping between the logical address and the other physical address in the mapping table.

Accordingly, the FTL may enable the data to be stored in a different physical location that is different from a storage address shown from the outside the device, enabling the device to follow the restrictions of a flash memory and to be performed as the conventional storage device.

The FTL may be classified, based on an address translation unit, into a page (write) unit address translation and a block (erase) unit address translation. The page unit address translation precisely performs address translation and may give a high performance, while a manufacturing cost increases since a size of the address translation table increases.

As an example, a storage device constituted by a flash, such as a solid-state Drive (SSD), may include the FTL and the RAID layer to have a fault-tolerance function in a chip level in the same manner as the RAID. However, the RAID may not provide a high performance with respect to writing a small amount of data.

SUMMARY

In one general aspect, there is provided a flash memory address translation apparatus, the apparatus comprising: a chip configured to be partitioned based on a horizontal bank and a vertical channel; and a controller configured to receive control information from a host to control the chip based on the control information, wherein the bank is configured to be divided by a stripe partition, and wherein a stripe buffer is allocated to each of the stripe partition.

The apparatus may further include that: the stripe partition comprises a chip partition; the stripe buffer is allocated to the chip partition; and the chip partition is divided into a block stripe.

The apparatus may further include that: the chip partition comprises a page; and the block stripe is divided into a page stripe comprising the page.

The apparatus may further include that the controller is further configured to record information based on a stripe unit using the chip.

The apparatus may further include that the controller is further configured to read information based on a page unit using the chip.

The apparatus may further include that the controller is further configured to erase information or collect garbage based on a block stripe unit using the chip.

The apparatus may further include that the stripe buffer comprises a page buffer.

The apparatus may further include that: the page buffer is configured to store information in a size of a page; and the stripe buffer is determined based on a hash function corresponding to an address of the information in the size of the page.

The apparatus may further include that: the information in the size of the page is stored in the page buffer; and the information in the size of the page is stored in a format of a page stripe when the information is stored in all page buffers of the stripe buffer.

The apparatus may further include that: the controller is further configured to control a storage information to be stored in a storage area corresponding to an address of the storage information; and the storage area comprises the stripe partition.

The apparatus may further include that the stripe partition comprises an independent area.

In another general aspect, there is provided a method of translating a flash memory address, the method comprising: maintaining a chip that is partitioned based on a horizontal bank and a vertical channel; dividing the bank by a stripe partition; and allocating a stripe buffer to the stripe partition.

The method may further include: dividing the stripe partition by a chip partition of the chip; and dividing the chip partition into a block stripe.

The method may further include: dividing the block stripe into a page stripe comprising the page, wherein the chip partition comprises a page.

The method may further include recording information based on a page stripe unit using the chip.

The method may further include reading information based on a page unit using the chip.

The method may further include: erasing information based on a block stripe unit using the chip; and collecting garbage based on a block stripe unit using the chip.

The method may further include that: a parity page and data pages with arbitrary logical addresses in a single page stripe are sequentially stored using the stripe buffer; and a relationship between the parity pages and the data pages is based on physical address by a flash mapping method.

The method may further include generating a parity page from the page stripe where the data pages with arbitrary logical addresses in a single page stripe are sequentially stored.

The method may further include successively mapping the logical addresses of data pages to the successively physical addresses in a page stripe.

In another general aspect, there is provided a method of translating a flash memory address, the method comprising: maintaining a chip that is partitioned based on a horizontal bank and a vertical channel; dividing the chip into a chip partition; generating a stripe partition from the chip partition, chosen from the chip; and allocating a stripe buffer to the vertical stripe partition, wherein the chip is divided into a chip partition by a stripe partition.

In another general aspect, there is provided a non-transitory computer readable recoding medium storing the method of claim 12.

Other features and aspects will be apparent from the following detailed description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1A:
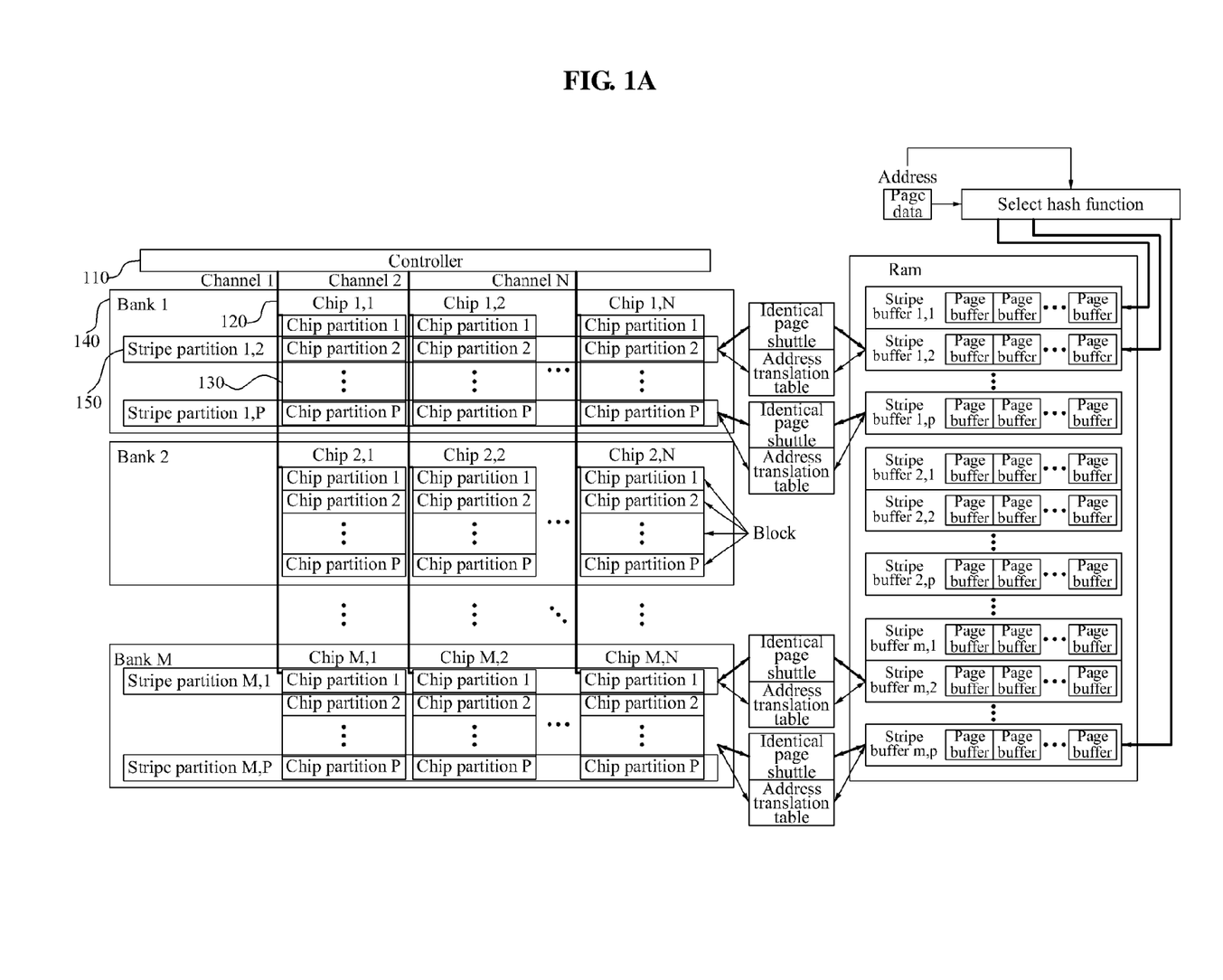
FIG. 1A is a block diagram illustrating an example of a flash memory address translation apparatus.

FIG. 1A illustrates an example of a flash memory address translation apparatus.

The flash memory address translation apparatus may include at least one chip 130 that is partitioned based on at least one horizontal bank and at least one vertical channel, and a controller 110 that receives control information from a host and controls the at least one chip based on a control information.

In one example, the at least one bank may be divided by at least one stripe partition and a stripe buffer may be allocated to each of the at least one stripe partition.

As an example, the flash memory address translation apparatus may include the controller 110 to control the at least one chip 130, as an example a flash memory, and the controller 110 and the at least one chip 130 may be connected by N channels 120 to transmit information to the at least one chip 130 and to receive information from the at least one chip 130.

For instance, M chips may be connected to each of the channels, and thus, a total of N×M chips may be maintained according to an embodiment.

In some embodiments, the at least one chip 130 may be divided based on a stripe partition scheme. In one example, an at least one stripe partition 150 may be constituted by M×P stripe partitions, as illustrated in FIG. 1.

As an example, according to an embodiment, a physical space of each chip may be regularly divided to form P chip partitions. The $P^{th}$ partitions of chips (chip M,1 through chip M,N) included in an $M^{th}$ bank may constitute a stripe partition M,P.

Figure 1B:
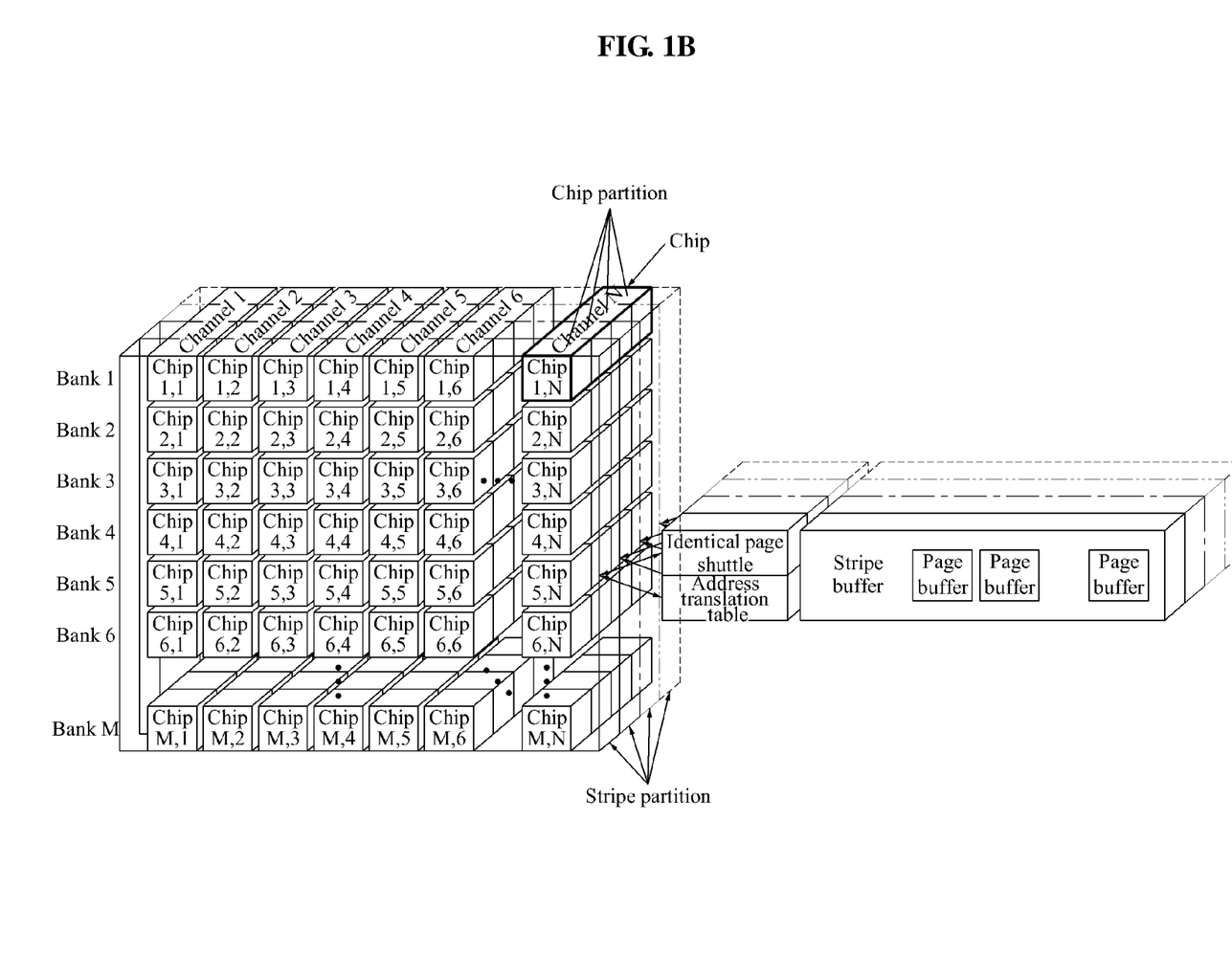
FIG. 1B is a block diagram illustrating another example of a flash memory address translation apparatus.

FIG. 1B illustrates another example of a flash memory address translation apparatus.

As an example, each of the at least one chip may be constituted by the same number of chip partitions as the number of stripe partitions, and selected chip partitions, one from each of N×M chips, may constitute a single stripe partition. For example, according to an embodiment, a single stripe partition may include all channels and all banks. Also, as an example, four stripe partitions may exist as illustrated in FIG. 1B.

Figure 2:
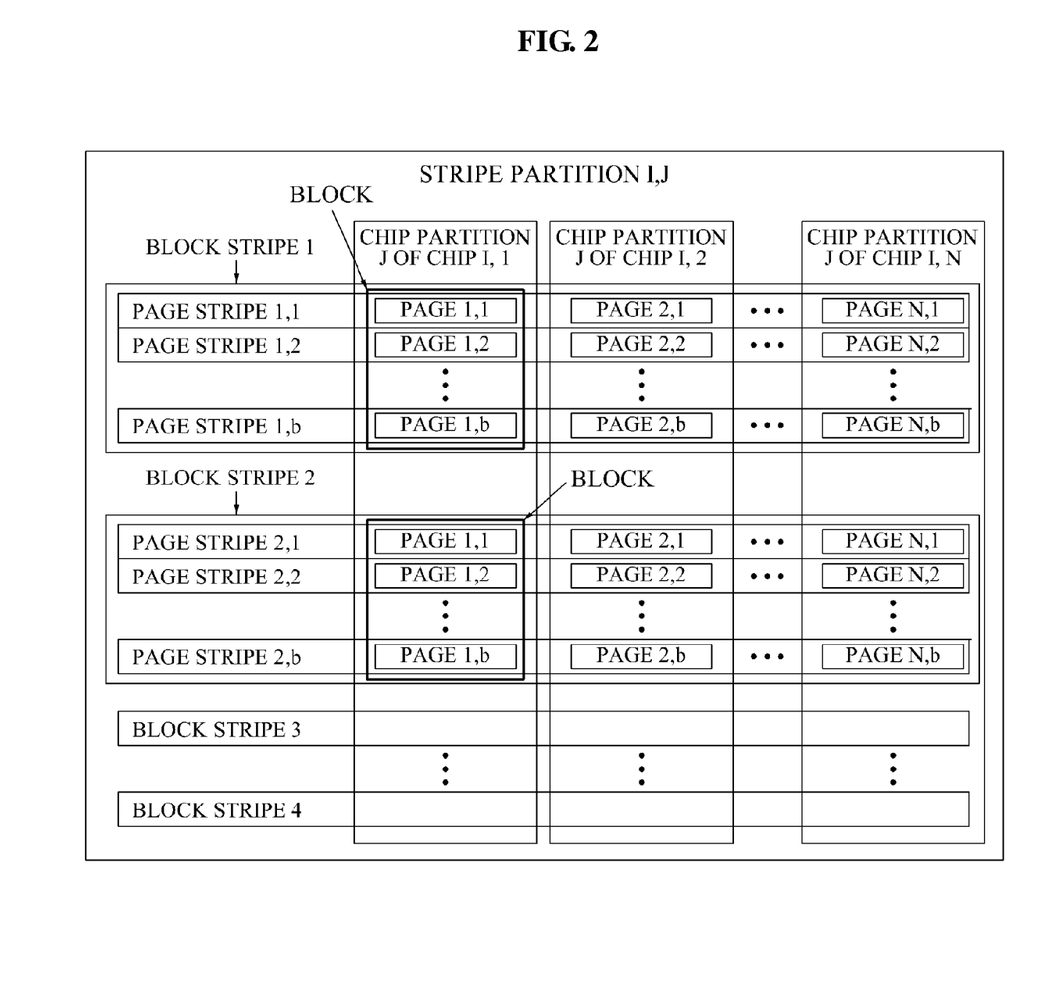
FIG. 2 is a diagram illustrating an example of a stripe partition.

FIG. 2 illustrates an example of an inside of a stripe partition.

Referring to FIG. 2, the stripe partition according to an embodiment may be divided into at least one block stripe including at least one chip partition of at least one chip.

In one example, the at least one chip partition may include at least one page, and each of the at least one block stripe may be divided into at least one page stripe including the at least one page.

As an example, the stripe partition of FIG. 2 may be constituted by B block stripes, and each of the block stripes may be constituted by b page stripes. For reference, each of the page stripes may be constituted by N pages, each of the pages being from different chips. In one example, the page may be a basic unit for reading from a storage medium and a basic unit for writing in the storage medium.

In one example, according to an embodiment, each memory may be constituted by a block, and the block may be an erase unit that is constituted by b pages. A page is a read unit and a write unit. In the stripe partition I,J, a block stripe X may be constituted by $X^{th}$ blocks of a chip I,1 through a chip I,N. Also, a page stripe K,1 may be constituted by first pages of $K^{th}$ blocks of the chip I,1 through the chip I,N.

The controller 110 of the flash memory address translation apparatus may control to record information, namely, to perform a write command, based on at least one page stripe unit using the at least one chip 130.

The controller 110 of the flash memory address translation apparatus may control to read information based on the at least one page unit using the at least one chip 130, and may control to erase information or to collect garbage based on at least one block stripe unit.

Figure 3:
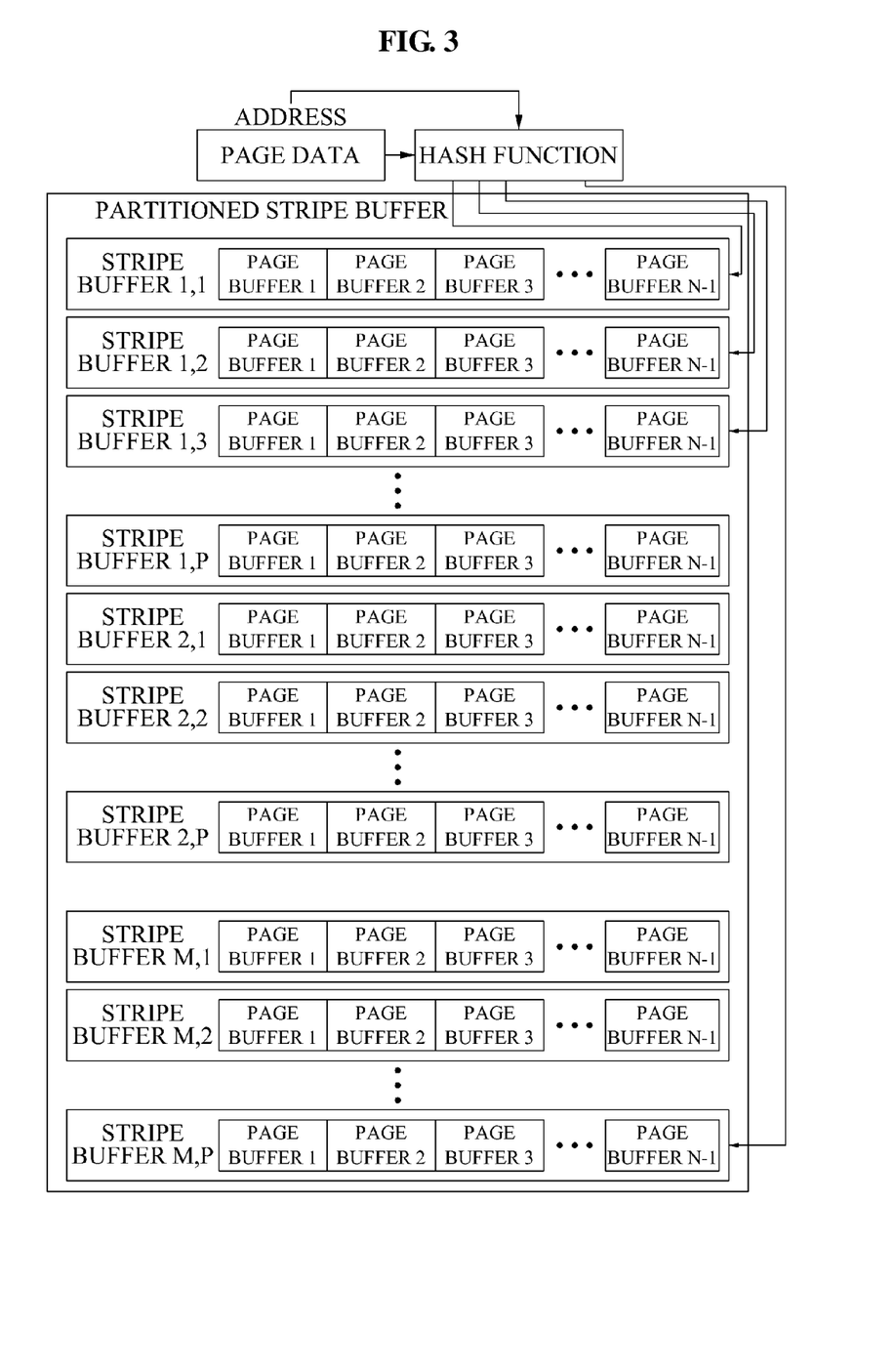
FIG. 3 is a diagram illustrating an example of a buffer memory.

FIG. 3 illustrates an example of a buffer memory.

Referring to FIG. 3, each stripe partition may include a stripe buffer, and each of the stripe buffer may include at least one page buffer.

In one example, each of the at least one page buffer may include information in a size of a page, and the stripe buffer may be determined based on a hash function corresponding to an address of the information in the size of the page.

The information in the size of the page may be stored in at least one of the at least one page buffer, and the information in the size of the page may be stored in a format of a page stripe when the information is stored in all page buffers of the stripe buffer.

As an example, the flash memory address translation apparatus may include a stripe buffer for each stripe partition as illustrated in FIG. 3, and each stripe buffer may include N−1 page buffers.

Each of page buffers may be a memory storing data in a page size. As an example, a page buffer may be a storage device that is quickly accessible, such as a DRAM, SRAM, and the like.

When a command for writing data in the page size with a logical address is received from a host, the controller 120 may determine a corresponding stripe buffer by a hash function to which the logical address of the data is inputted.

The stripe buffer that stores the data page may be determined based on the logical address of the data page, and the data page may be stored in an empty page buffer in the stripe buffer. When the empty page buffer does not exist in the stripe buffer, the stripe buffer may be stored in a page stripe. Therefore, the data pages from the host can be sequentially stored in a page stripe regardless of their logical addresses.

As described above, the controller 110 may control at least one piece of storage information to be stored in a storage area corresponding to an address of the storage information. In one example, the storage area may be one of the at least one stripe partition and each of the at least one stripe partition may be an independent area.

Figure 4:
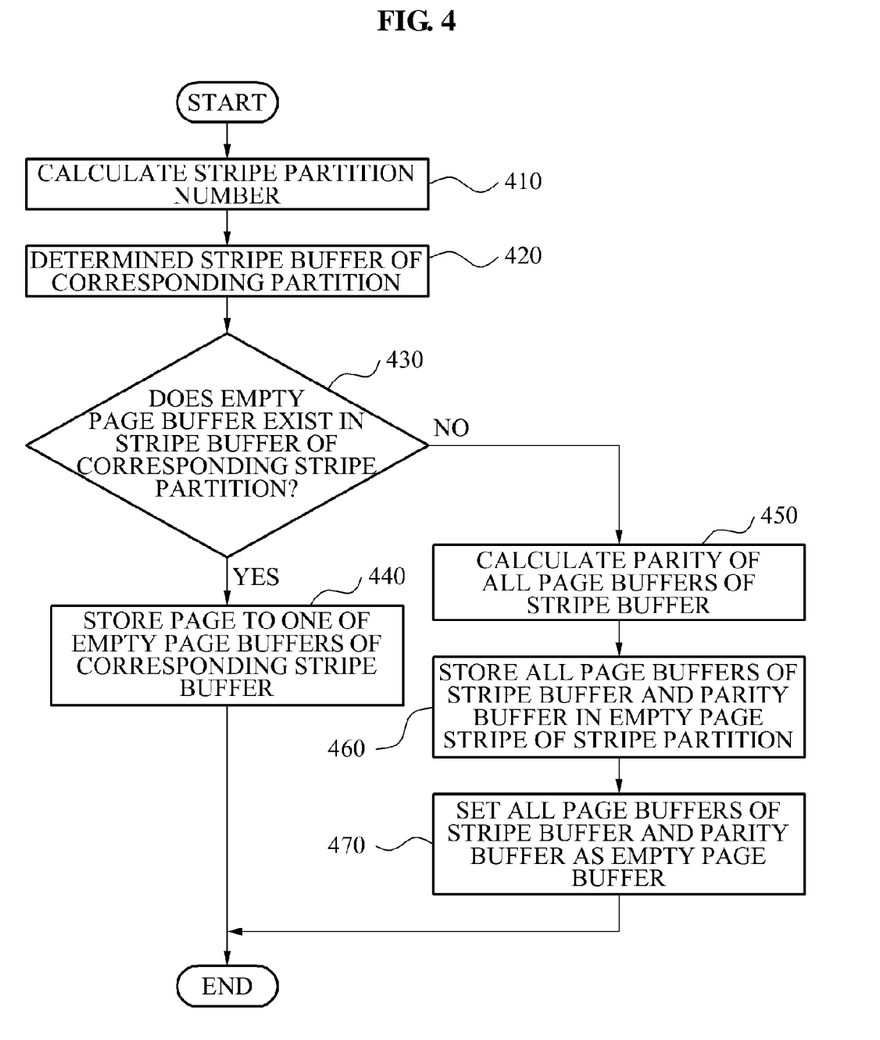
FIG. 4 is a flowchart illustrating an example of a process of writing information in a memory.

FIG. 4 illustrates an example of a write process.

In operation 410, the flash memory address translation apparatus may calculate a stripe partition number according to a write command, and in operation 420, may determine a stripe buffer of a corresponding stripe partition.

In operation 430, the flash memory address translation apparatus according to an embodiment may determine whether an empty page buffer exists in the stripe buffer of the corresponding stripe partition. In operation 440, in response to determining that the empty page buffer exists, the flash memory address translation apparatus may store the data page for the write command to one of the empty page buffers in the corresponding stripe buffer.

As an example, a stripe buffer may be stored in any page stripe, e.g., pages in a stripe buffer M,P may be stored in any page stripe among page stripes of a stripe partition M,P.

The flash memory address translation apparatus may sequentially store, in a single page stripe, multiple pages in an order of that a writing command is received from a host, regardless of a logical address of data.

For example, according to an embodiment, a physical address may be stored in a successive address in the page stripe, regardless of the logical address, and thus, an association between the logical address and the physical address does not exist. Accordingly, a mapping table between the logical address and the physical address may be maintained.

The flash memory address translation apparatus according to an embodiment may include a table to connect a host-view address of data page, e.g., a logical address of the data page, with a physical address where the data page is actually stored. The described process is referred to as an "address mapping." The address mapping may be performed by various mapping processes, and the address mapping may not be limited thereto.

In operation 450, in response to the empty page buffer not existing in the stripe buffer, the flash memory address translation apparatus may generate a parity page for all page buffers in the stripe buffer.

After operation 450 is performed, the flash translation apparatus may store a parity page in a physical address based-stripe where the relationship between data pages and the parity page is determined by their physical addresses after performing the mapping process instead of by their logical addresses. In a conventional RAID technology, when a random write from the host requires two reads and two writes from or to flash memories to generates a parity. However, in some embodiments, 1+(1/N) writes to flash memories for a single write from the host may be performed in the flash address translation, and thus, a write performance may be dramatically improved. For example, N is the number of chips constituting the stripe.

In operation 460, the flash memory address translation apparatus according to an embodiment may store all page buffers of the stripe buffer and the parity buffer in an empty page stripe of the corresponding stripe partition. In operation 470, the flash memory address translation apparatus may set all of the page buffers and the parity buffer as the empty page buffers.

As an example, when it is presumed that the stripe buffer includes N−1 data pages and the stripe partition includes N pages, parity page may be generated from N−1 data pages of the stripe buffer and the generated parity page and the data pages may be stored in the N pages of the stripe partition. For example, a storing sequence may not be limited.

According to an embodiment, the parity may be stored in each page stripe, in each stripe partition, or in each bank. Also, a parity page may not have a logical address, and may be stored together with metadata used for identifying the parity page.

According to an embodiment, the stripe buffer may include N−2 data pages, and two syndrome pages may be stored in a page stripe constituted by N pages.

Figure 5:
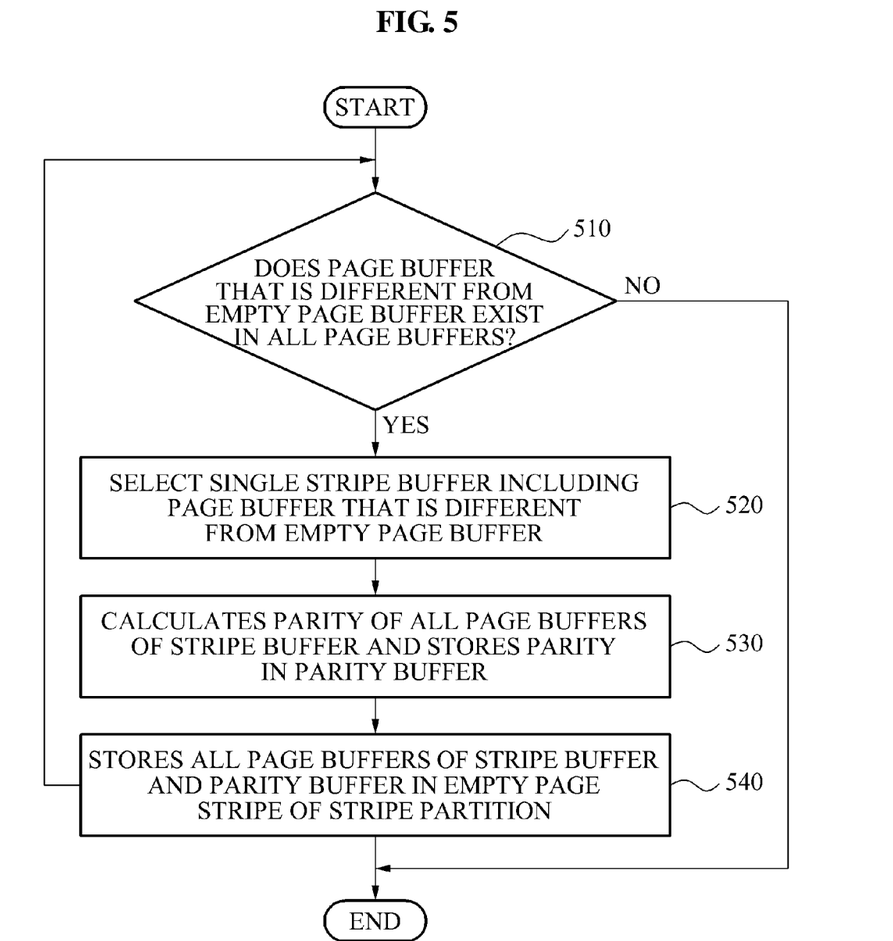
FIG. 5 is a flowchart illustrating an example of a flush process.

FIG. 5 illustrates an example of a flush process.

Referring to FIG. 5, the flash memory address translation apparatus according to an embodiment may perform a process of flushing information.

In operation 510, the flash memory address translation apparatus may determine whether a page buffer that is different from an empty page buffer exists among all page buffers. In operation 520, in response to the page buffer different from the empty page buffer existing, the flash memory address translation apparatus may select a single stripe buffer including a page buffer that is different from the empty page buffer. For example, the corresponding stripe buffer may include an empty page buffer.

In operation 530, the flash memory address translation apparatus calculates a parity of all page buffers of the selected stripe buffer and stores the parity in a parity buffer. For example, all data of an empty page buffer may be regarded as zero.

In operation 540, the flash memory address translation apparatus may store the all page buffers of the selected stripe buffer and the parity buffer in an empty page stripe of the stripe partition. For example, according to an embodiment, the empty page buffer may be stored as a null page.

As an example, when the flash memory address translation apparatus receives a flush command from a host or determines to perform a flush process, the flash memory address translation apparatus may store the all page buffers in the stripe buffer in a memory. In one example, even though the flash memory address translation apparatus stores the all page buffers in the stripe buffer in the memory, an empty page buffer may exist in the stripe buffer during a flushing process.

The flash memory address translation apparatus may select, as a flush operation, a stripe buffer including a valid page buffer that is not empty, and may store a corresponding stripe in any stripe page.

For example, according to an embodiment, an empty page may be stored together with a null identification factor; and valid data pages, null pages, and a parity page may be combined to be stored as a complete page stripe unit.

The empty page buffer, e.g., a null page buffer, may be stored in a page of a flash memory together with the metadata to indicate that a null page is stored in the page of the flash memory.

Figure 6:
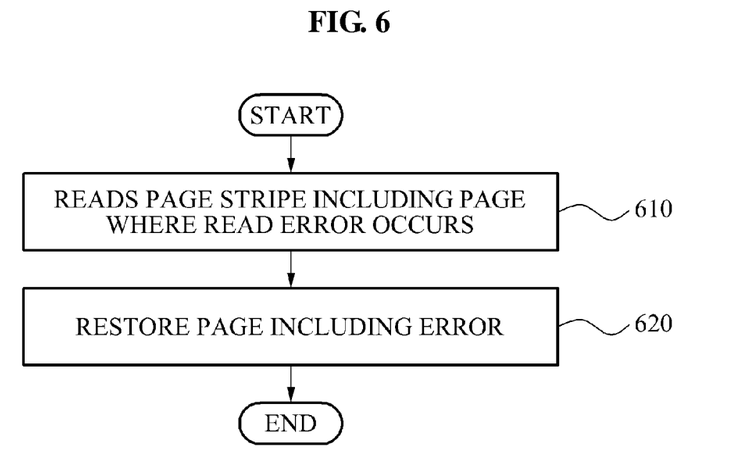
FIG. 6 is a flowchart illustrating an example of a read error process.

FIG. 6 illustrates an example of a read error process.

When a page read error occurs, the flash memory address translation apparatus according to an embodiment may manage the page read error based on the read error process of FIG. 6.

In operation 610, the flash memory address translation apparatus may read all pages of a page stripe including a page where a read error occurs. For example, the flash memory address translation apparatus may read the all pages excluding the page including the read error.

In operation 620, the flash memory address translation apparatus may calculate a parity for the read pages to recover the page including the error.

As an example, when a read error occurs in a page that is arbitrarily read by the flash memory address translation apparatus, the flash memory address translation apparatus may read remaining pages excluding the page including the read error from among all pages of the page stripe where the page including the read error is included, and may calculate a parity based on the read pages to recover the page including the read error.

When the number of empty page stripes of an arbitrary stripe partition is less than a predetermined number, the flash memory address translation apparatus may perform a garbage collection with respect to the stripe partition.

A garbage collection process according to an embodiment may be separately performed for each stripe partition. A valid page is only copied from a block stripe including a null page to another block stripe, the block stripe including the null page is erased to make all pages of the block stripe as empty pages, and thus, the number of empty pages may increase.

The null page according to an embodiment may be generated from a flush process or from the garbage collection process. Also, the latest data may invalidate past data including the same host-view address.

According to an embodiment, a stripe partition in which the garbage collection is to be performed may be selected according to an arbitrary scheme, only a valid page of the selected stripe partition is selected, and the selected valid page is copied, together with a new parity, to another block stripe including an empty page stripe, based on a page stripe unit.

In response to the number of valid pages being insufficient for constituting a complete page stripe, the valid page may be stored together with null data to constitute the complete page stripe and may be stored based on a page stripe.

Figure 7:
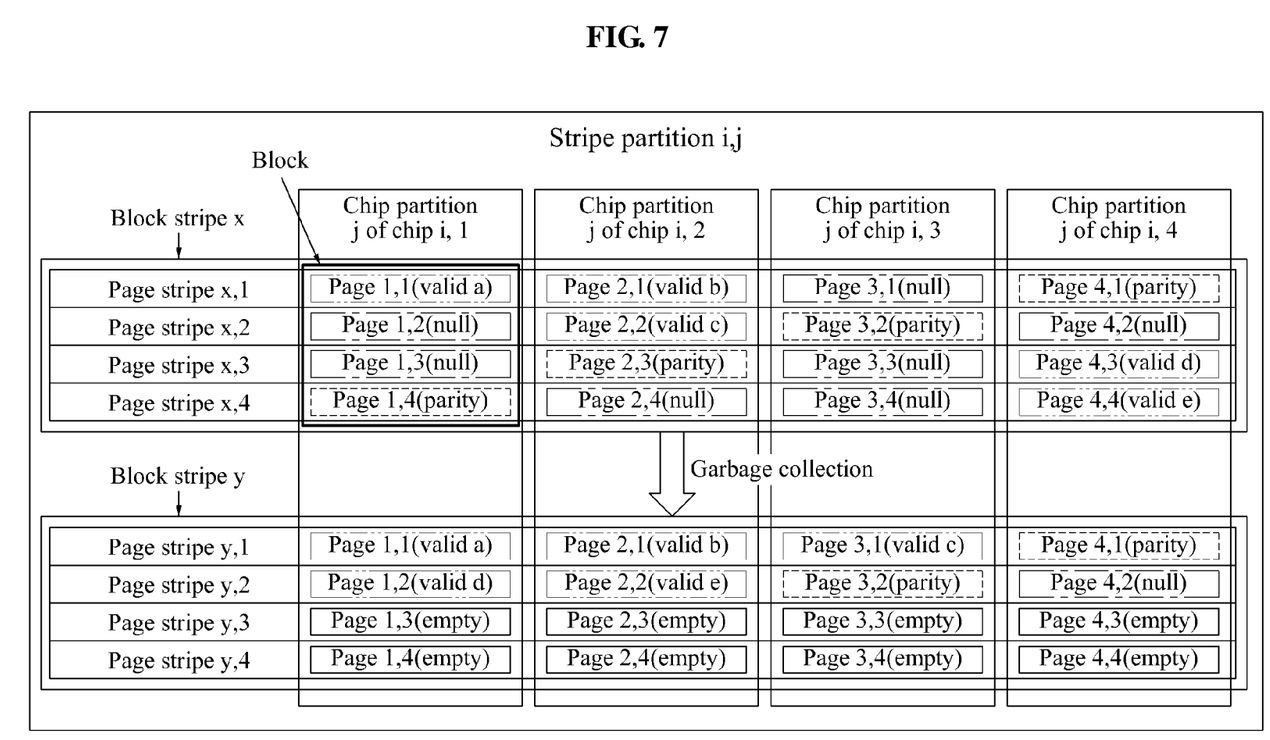
FIG. 7 is a diagram illustrating an example of a garbage collecting process.

FIG. 7 illustrates an example of a garbage collecting process.

As a nonlimiting example, four pages constitute a single block in the flash memory address translation apparatus according to an embodiment, and four page stripes may constitutes a single block stripe as illustrated in FIG. 7.

Five valid pages may exist in a block stripe x according to an embodiment. Only the five valid pages are copied to a block stripe y, a new parity is generated with respect to a page (valid a), a page (valid b), and a page (valid c), and the pages and the parity may be stored as a page stripe y,1. As an example, a parity of the stripe x may not be used, and a new parity may be generated in the stripe y.

Remaining valid pages in the block stripe x may be a page (valid d) and a page (valid e). In the illustrated example, one page is insufficient for constituting a complete page stripe when the remaining pages and the new parity constitute the complete page.

Accordingly, the page (valid d), a page (valid e), and a null page may be stored as a single page stripe.

According to an embodiment, a parity page with respect to the page (valid d) and the page (valid e) may also be stored in the page stripe.

According to an embodiment, a flash translation layer (FTL) alone may provide a chip fault-tolerance function, preventing a degradation of a performance.

According to an embodiment, a flash software may be provided to more effectively support a chip fault-tolerance function in a solid state drive (SSD).

According to an embodiment, information may be stored in a SSD without data loss even when an error in a chip level occurs in addition to an error in a page level.

According to an embodiment, only (1+1/N) page write operations may always be generated per one page write request regardless of write request sizes, and thus, a performance can be improved.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A flash memos address translation apparatus, the apparatus comprising:
    a chip configured to be partitioned based on a horizontal bank and a vertical channel; and
    a controller configured to receive control information from a host to control the chip based on the control information,
    wherein the bank is configured to be divided by a stripe partition, and
    wherein a stripe buffer is allocated to each of the stripe partition
    wherein the stripe buffer comprises a page buffer.

2. The apparatus of claim 1, wherein:
    the stripe partition comprises a chip partition;
    the stripe buffer is allocated to the chip partition; and
    the chip partition is divided into a block stripe.

3. The apparatus of claim 2, wherein:
    the chip partition comprises a page; and
    the block stripe is divided into a page stripe comprising the page.

4. The apparatus of claim 3, wherein the controller is further configured to record information based on a stripe unit using the chip.

5. The apparatus of claim 3, wherein the controller is further configured to read information based on a page unit using the chip.

6. The apparatus of claim 3, wherein the controller is further configured to erase information or collect garbage based on a block stripe unit using the chip.

7. The apparatus of claim 1, wherein:
    the page buffer is configured to store information in a size of a page; and
    the stripe buffer is determined based on a hash function corresponding to an address of the information in the size of the page.

8. The apparatus of claim 7, wherein:
    the information in the size of the page is stored in the page buffer; and
    the information in the size of the page is stored in a format of a page stripe when the information is stored in all page buffers of the stripe buffer.

9. The apparatus of claim 1 wherein:
    the controller is further configured to control a storage information to be stored in a storage area corresponding to an address of the storage information; and
    the storage area comprises the stripe partition.

10. The apparatus of claim 1, wherein the stripe partition comprises an independent area.

11. A method of translating a flash memory address, the method comprising:
    maintaining a chip that is partitioned based on a horizontal bank and a vertical channel;
    dividins the bank by a stripe partition:
    allocating a stripe buffer to the stripe partition:
    a parity page and data pages with arbitrary logical addresses in a single page stripe are sequentially stored using the stripe buffer; and
    a relationship between the parity pages and the data pages is based on physical address by a flash mapping method.

12. The method of claim 11, further comprising:
    dividing the stripe partition by a chip partition of the chip; and
    dividing the chip partition into a block stripe.

13. The method of claim 12 further comprising:
    dividing the block stripe into a page stripe comprising the page,
    wherein the chip partition comprises a page.

14. The method of claim 13, further comprising recording information based on a page stripe unit using the chip.

15. The method of claim 13, further comprising reading information based on a page unit using the chip.

16. The method of claim 13, further comprising:
    erasing information based on a block stripe unit using the chip; and
    collecting garbage based on a block stripe unit using the chip.

17. The method of claim 11, further comprising generating a parity page from the page stripe where the data pages with arbitrary logical addresses in a single page stripe are sequentially stored.

18. The method of claim 11, further comprising successively mapping the logical addresses of data pages to the successively physical addresses in a page stripe.

19. A non-transitory computer readable recoding medium storing the method of claim 11.

* * * * *